US 6,704,730 B2

(12) United States Patent
Moulton et al.

(10) Patent No.: US 6,704,730 B2
(45) Date of Patent: Mar. 9, 2004

(54) HASH FILE SYSTEM AND METHOD FOR USE IN A COMMONALITY FACTORING SYSTEM

(75) Inventors: Gregory Hagan Moulton, Irvine, CA (US); Stephen B. Whitehill, Tustin, CA (US)

(73) Assignee: Avamar Technologies, Inc., Irvine, CA (US)

( * ) Notice: Subject to any disclaimer, the term of this patent is extended or adjusted under 35 U.S.C. 154(b) by 405 days.

(21) Appl. No.: 09/777,150

(22) Filed: Feb. 5, 2001

(65) Prior Publication Data

US 2001/0037323 A1 Nov. 1, 2001

Related U.S. Application Data

(60) Provisional application No. 60/183,762, filed on Feb. 18, 2000.

(51) Int. Cl.⁷ .............................................. G06F 17/30
(52) U.S. Cl. ................................ 707/6; 707/7; 707/204
(58) Field of Search ................................ 707/7, 6, 204; 714/798; 717/139; 341/87, 51

(56) References Cited

U.S. PATENT DOCUMENTS

| | | | |
|---|---|---|---|
| 3,668,647 A | 6/1972 | Evangelisti et al. | 340/172.5 |
| 4,215,402 A | 7/1980 | Mitchell et al. | 364/200 |
| 4,404,676 A * | 9/1983 | DeBenedictis | 714/798 |
| 4,649,479 A | 3/1987 | Advani et al. | 364/300 |
| 4,761,785 A | 8/1988 | Clark et al. | 371/51 |
| 4,887,204 A | 12/1989 | Johnson et al. | 364/200 |
| 4,887,235 A | 12/1989 | Holloway et al. | 364/900 |
| 4,897,781 A | 1/1990 | Chang et al. | 364/200 |
| 4,901,223 A | 2/1990 | Rhyne | 364/200 |
| 4,929,946 A * | 5/1990 | O'Brien et al | 341/87 |
| 4,982,324 A | 1/1991 | McConaughy et al. | 364/200 |
| 5,005,122 A | 4/1991 | Griffin et al. | 364/200 |
| 5,016,009 A | 5/1991 | Whiting et al. | 341/67 |
| 5,018,060 A | 5/1991 | Gelb et al. | 364/200 |
| 5,089,958 A | 2/1992 | Horton et al. | 395/575 |
| 5,109,515 A | 4/1992 | Laggis et al. | 395/725 |
| 5,126,739 A | 6/1992 | Whiting et al. | 341/106 |
| 5,133,065 A | 7/1992 | Cheffetz et al. | 395/575 |
| 5,140,321 A | 8/1992 | Jung | 341/55 |
| 5,146,568 A | 9/1992 | Flaherty et al. | 395/325 |
| 5,155,835 A | 10/1992 | Belsan | 395/425 |

(List continued on next page.)

FOREIGN PATENT DOCUMENTS

WO     WO-96/25801 A1  *  8/1996     ............ H03M/7/30

OTHER PUBLICATIONS

Hegazy, A.E.F.A. "Searching Large Textual Files for Near Matching Patterns", Dissertation, School of Engineering and Applied Science, George Washington University, Jul. 24, 1985.*

Hegazy, A.E.F.A. "Searching Large Textual Files for Near Matching Patterns", Dissertation, School of Engineering and Applied Sciences, George Washington University, Jul. 24, 1985.

*Primary Examiner*—Jean M. Corrielus
(74) *Attorney, Agent, or Firm*—William J. Kubida; Eugene J. Bernard; Hogan & Hartson LLP

(57) ABSTRACT

A system and method for a computer file system that is based and organized upon hashes and/or strings of digits of certain, different, or changing lengths and which is capable of eliminating or screening redundant copies of aggregate blocks of data (or parts of data blocks) from the system. The hash file system of the present invention utilizes hash values for computer files or file pieces which may be produced by a checksum generating program, engine or algorithm such as industry standard MD4, MD5, SHA or SHA-1 algorithms. Alternatively, the hash values may be generated by a checksum program, engine, algorithm or other means that produces an effectively unique hash value for a block of data of indeterminate size based upon a non-linear probablistic mathematical algorithm.

45 Claims, 10 Drawing Sheets

U.S. PATENT DOCUMENTS

| | | | |
|---|---|---|---|
| 5,162,986 A | 11/1992 | Graber et al. | 364/146 |
| 5,163,148 A | 11/1992 | Walls | 395/600 |
| 5,210,866 A | 5/1993 | Milligan et al. | 395/575 |
| 5,218,695 A | 6/1993 | Noveck et al. | 395/600 |
| 5,239,637 A | 8/1993 | Davis et al. | 395/425 |
| 5,239,647 A | 8/1993 | Anglin et al. | 395/600 |
| 5,239,659 A | 8/1993 | Rudeseal et al. | 395/800 |
| 5,263,154 A | 11/1993 | Eastridge et al. | 395/575 |
| 5,276,860 A | 1/1994 | Fortier et al. | 395/575 |
| 5,276,867 A | 1/1994 | Kenley et al. | 395/600 |
| 5,278,838 A | 1/1994 | Ng et al. | 371/10.1 |
| 5,281,967 A | 1/1994 | Jung | 341/55 |
| 5,305,389 A | 4/1994 | Palmer | 382/1 |
| 5,317,728 A | 5/1994 | Tevis et al. | 395/600 |
| 5,325,505 A | 6/1994 | Hoffecker et al. | 395/425 |
| 5,347,653 A | 9/1994 | Flynn et al. | 395/600 |
| 5,355,453 A | 10/1994 | Row et al. | 395/200 |
| 5,367,637 A | 11/1994 | Wei | 395/250 |
| 5,367,698 A | 11/1994 | Webber et al. | 395/800 |
| 5,379,418 A | 1/1995 | Shimazaki et al. | 395/575 |
| 5,403,639 A | 4/1995 | Belsan et al. | 395/600 |
| 5,404,508 A | 4/1995 | Konrad et al. | 395/600 |
| 5,404,527 A | 4/1995 | Irwin et al. | 395/700 |
| 5,406,279 A | 4/1995 | Anderson et al. | 341/51 |
| 5,448,718 A | 9/1995 | Cohn et al. | 395/404 |
| 5,452,440 A | 9/1995 | Salsburg | 395/463 |
| 5,452,454 A | 9/1995 | Basu | 395/700 |
| 5,454,099 A | 9/1995 | Myers et al. | 395/575 |
| 5,479,654 A | 12/1995 | Squibb | 395/600 |
| 5,487,160 A | 1/1996 | Bemis | 395/441 |
| 5,497,483 A | 3/1996 | Beardsley et al. | 395/575 |
| 5,513,314 A | 4/1996 | Kandasamy et al. | 395/182.04 |
| 5,515,502 A | 5/1996 | Wood | 395/182.13 |
| 5,521,597 A * | 5/1996 | Dimitri | 341/51 |
| 5,524,205 A | 6/1996 | Lomet et al. | 395/182.14 |
| 5,535,407 A | 7/1996 | Yanagawa et al. | 395/800 |
| 5,544,320 A | 8/1996 | Konrad | 395/200.09 |
| 5,559,991 A | 9/1996 | Kanfi | 395/489 |
| 5,574,906 A | 11/1996 | Morris | 395/601 |
| 5,586,322 A | 12/1996 | Beck et al. | 395/616 |
| 5,604,862 A | 2/1997 | Midgely et al. | 395/182.04 |
| 5,606,719 A | 2/1997 | Nichols et al. | 395/876 |
| 5,640,561 A | 6/1997 | Satoh et al. | 395/618 |
| 5,649,196 A | 7/1997 | Woodhill et al. | 395/620 |
| 5,659,743 A | 8/1997 | Adams et al. | 395/621 |
| 5,659,747 A | 8/1997 | Nakajima | 395/651 |
| 5,696,901 A | 12/1997 | Konrad | 395/200.09 |
| 5,742,811 A * | 4/1998 | Agrawal et al. | 707/6 |
| 5,751,936 A | 5/1998 | Larson et al. | 395/182.05 |
| 5,754,844 A * | 5/1998 | Fuller | 707/6 |
| 5,765,173 A | 6/1998 | Cane et al. | 707/204 |
| 5,771,354 A | 6/1998 | Crawford | 395/200.59 |
| 5,778,395 A | 7/1998 | Whiting et al. | 707/204 |
| 5,794,254 A | 8/1998 | McClain | 707/204 |
| 5,802,264 A | 9/1998 | Chen et al. | 395/182.04 |
| 5,802,297 A | 9/1998 | Engquist | 395/200.42 |
| 5,831,558 A | 11/1998 | Harvell | 341/106 |
| 5,850,565 A | 12/1998 | Wightman | 315/821 |
| 5,915,024 A * | 6/1999 | Kitaori et al. | 713/176 |
| 5,933,104 A * | 8/1999 | Kimura | 341/87 |
| 5,978,791 A | 11/1999 | Farber et al. | 707/2 |
| 5,990,810 A * | 11/1999 | Williams | 341/51 |
| 6,014,676 A | 1/2000 | McClain | 707/204 |
| 6,016,553 A | 1/2000 | Schneider et al. | 714/21 |
| 6,029,168 A | 2/2000 | Frey | 707/10 |
| 6,044,220 A * | 3/2000 | Breternitz, Jr. | 717/139 |
| 6,085,298 A | 7/2000 | Ohran | 711/162 |
| 6,122,754 A | 9/2000 | Litwin et al. | 714/4 |
| 6,141,421 A * | 10/2000 | Takaragi et al. | 380/30 |
| 6,170,744 B1 * | 1/2001 | Lee et al. | 235/380 |
| 6,219,423 B1 * | 4/2001 | Davis | 380/268 |
| 6,268,809 B1 * | 7/2001 | Saito | 341/51 |
| 6,307,487 B1 | 10/2001 | Luby | |
| 6,320,520 B1 | 11/2001 | Luby | |
| 6,377,907 B1 * | 4/2002 | Waclawski | 702/182 |
| 6,535,894 B1 * | 3/2003 | Schmidt et al. | 707/204 |
| 6,553,494 B1 * | 4/2003 | Glass | 713/186 |

* cited by examiner

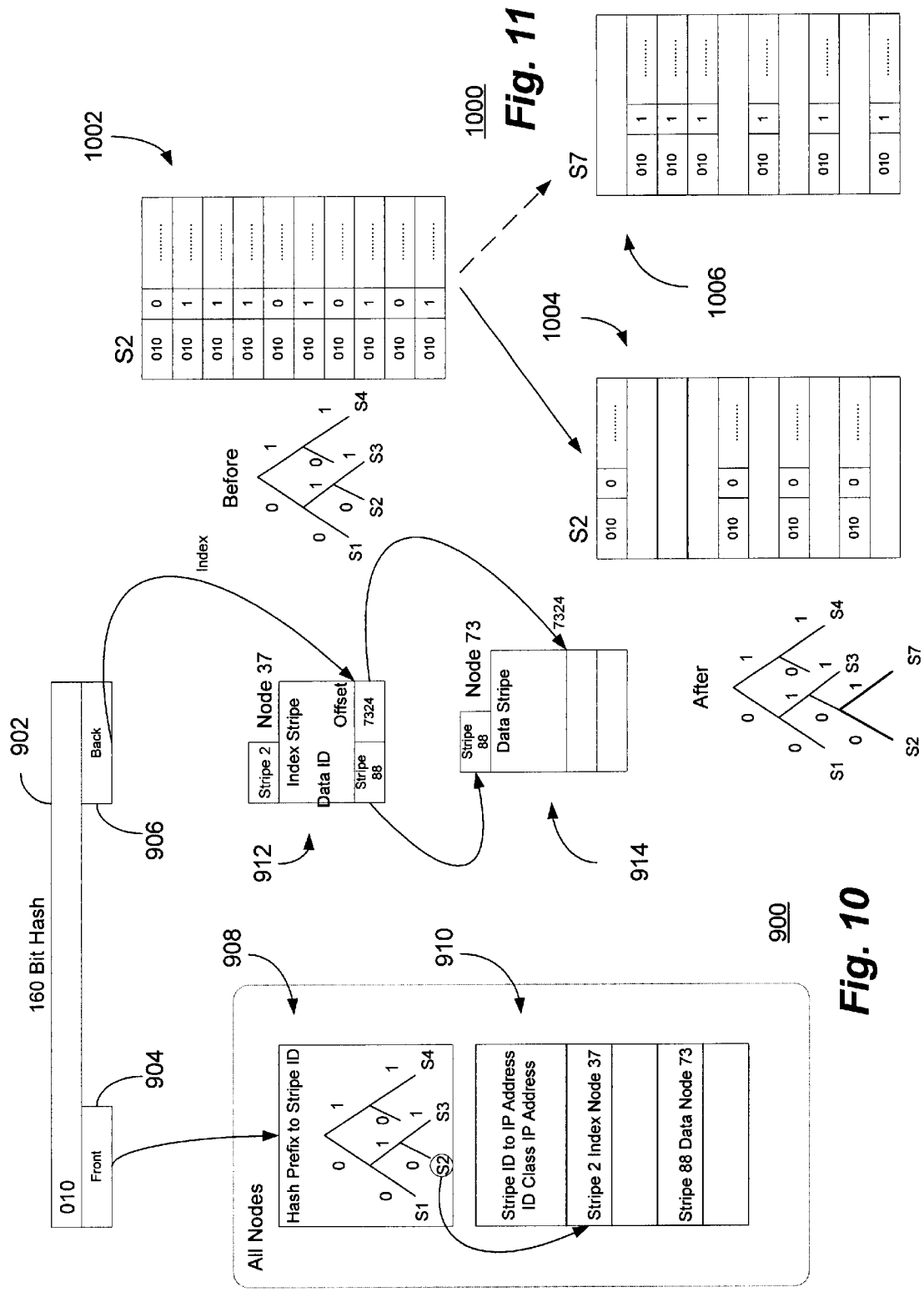

US 6,704,730 B2

HASH FILE SYSTEM AND METHOD FOR USE IN A COMMONALITY FACTORING SYSTEM

CROSS REFERENCE TO RELATED PATENT APPLICATIONS

The present invention claims priority from United States Provisional Patent Application Serial No. 60/183,762 for: "System and Method for Decentralized Data Storage" filed Feb. 18, 2000, the disclosure of which is herein specifically incorporated by this reference.

COPYRIGHT NOTICE/PERMISSION

A portion of the disclosure of this patent document may contain material which is subject to copyright protection. The copyright owner has no objection to the facsimile reproduction by anyone of the patent document of the patent disclosure as it appears in the United States Patent and Trademark Office patent file or records, but otherwise, reserves all copyright rights whatsoever. The following notice applies to the software and data and described below, inclusive of the drawing figures where applicable: Copyright©2000, Undoo Technologies.

BACKGROUND OF THE INVENTION

The present invention relates, in general, to the field of hash file systems and commonality factoring systems. More particularly, the present invention relates to a system and method for determining a correspondence between electronic files in a distributed computer data environment and particular applications therefor.

Economic, political, and social power are increasingly managed by data. Transactions and wealth are represented by data. Political power is analyzed and modified based on data. Human interactions and relationships are defined by data exchanges. Hence, the efficient distribution, storage, and management of data is expected to play an increasingly vital role in human society.

The quantity of data that must be managed, in the form of computer programs, databases, files, and the like, increases exponentially. As computer processing power increases, operating system and application software becomes larger. Moreover, the desire to access larger data sets such as multimedia files and large databases further increases the quantity of data that is managed. This increasingly large data load must be transported between computing devices and stored in an accessible fashion. The exponential growth rate of data is expected to outpace the improvements in communication bandwidth and storage capacity, making data management using conventional methods even more urgent.

Many factors must be balanced and often compromised in conventional data storage systems. Because the quantity of data is extremely large, there is continuing pressure to reduce the cost per bit of storage. Also, data management systems should be scaleable to contemplate not only current needs, but future needs as well. Preferably, storage systems are incrementally scaleable so that a user can purchase only the capacity needed at any particular time. High reliability and high availability are also considered as data users are increasingly intolerant of lost, damaged, and unavailable data. Unfortunately, conventional data management architectures must compromise these factors so that no one architecture provides a cost-effective, reliable, high availability, scaleable solution.

Conventional RAID (Redundant Array of Independent Disks) systems are a way of storing the same data in different places (thus, redundantly) on multiple storage devices such as hard disks. By placing data on multiple disks, input/output ("I/O") operations can overlap in a balanced way, improving performance. Since the use of multiple disks increases the mean time between failure ("MTBF"), storing data redundantly also increases fault-tolerance. A RAID system relies on a hardware or software controller to hide the complexities of the actual data management so that a RAID system appears to an operating system as a single logical hard disk. However, RAID systems are difficult to scale because of physical limitations in the cabling and controllers. Also, the availability of RAID systems is highly dependent on the functionality of the controllers themselves so that when a controller fails, the data stored behind the controller becomes unavailable. Moreover, RAID systems require specialized, rather than commodity hardware, and so tend to be expensive solutions.

NAS (network-attached storage) refers to hard disk storage that is set up with its own network address rather than being attached to an application server. File requests are mapped to the NAS file server. NAS may provide transparent I/O operations using either hardware or software based RAID. NAS may also automate mirroring of data to one or more other NAS devices to further improve fault tolerance. Because NAS devices can be added to a network, they enable scaling of the total capacity of the storage available to a network. However, NAS devices are constrained in RAID applications to the abilities of the conventional RAID controllers. Also, NAS systems do not enable mirroring and parity across nodes, and so are a limited solution.

In addition to data storage issues, data transport is rapidly evolving with improvements in wide area network ("WAN") and internetworking technology. The Internet, for example, has created a globally networked environment with almost ubiquitous access. Despite rapid network infrastructure improvements, the rate of increase in the quantity of data that requires transport is expected to outpace improvements in available bandwidth.

Philosophically, the way data is conventionally managed is inconsistent with the hardware devices and infrastructures that have been developed to manipulate and transport data. For example, computers are characteristically general-purpose machines that are readily programmed to perform a virtually unlimited variety of functions. In large part, however, computers are loaded with a fixed, slowly changing set of data that limit their general-purpose nature to make the machines special-purpose. Advances in processing speed, peripheral performance and data storage capacity are most dramatic in commodity computers. Yet many data storage solutions cannot take advantage of these advances because they are constrained rather than extended by the storage controllers upon which they are based. Similarly, the Internet was developed as a fault tolerant, multi-path interconnected network. However, network resources are conventionally implemented in specific network nodes such that failure of the node makes the resource unavailable despite the fault-tolerance of the network to which the node is connected. Continuing needs exist for high availability, high reliability, highly scaleable data storage solutions.

SUMMARY OF THE INVENTION

Disclosed herein is a system and method for a computer file system that is based and organized upon hashes and/or strings of digits of certain, different, or changing lengths and which is capable of eliminating or screening redundant copies of the blocks of data (or parts of data blocks) from the system. Also disclosed herein is a system and method for a computer file system wherein hashes may be produced by a checksum generating program, engine or algorithm such as industry standard Message Digest 4 ("MD4"), MD5, Secure Hash Algorithm ("SHA") or SHA-1 algorithms. Further disclosed herein is a system and method for a computer file system wherein hashes may be generated by a checksum program, engine, algorithm or other means that generates a probabilistically unique hash value for a block of data of indeterminate size based upon a non-linear probablistic mathematical algorithm or any industry standard technique for generating pseudo-random values from an input text of other data/numeric sequence.

The system and method of the present invention may be utilized, in a particular application disclosed herein, to automatically factor out redundancies in data allowing potentially very large quantities of unfactored storage to be often reduced in size by several orders of magnitude. In this regard, the system and method of the present invention would allow all computers, regardless of their particular hardware or software characteristics, to share data simply, efficiently and securely and to provide a uniquely advantageous means for effectuating the reading, writing or referencing of data. The system and method of the present invention is especially efficacious with respect to networked computers or computer systems but may also be applied to isolated data storage with comparable results.

The hash file system of the present invention advantageously solves a number of problems that plague conventional storage architectures. For example, the system and method of the present invention eliminates the need for managing a huge collection of directories and files, together with all the wasted system resources that inevitably occur with duplicates, and slightly different copies. The maintenance and storage of duplicate files plagues traditional corporate and private computer systems and generally requires painstaking human involvement to "clean up disk space". The hash file system of the present invention effectively eliminates this problem by eliminating the disk space used for copies and nearly entirely eliminating the disk space used in partial copies. For example, in a traditional computer system copying a gigabyte directory structure to a new location would require another gigabyte of storage. In particular applications, the hash file system of the present invention reduces the disk space used in this operation by up to a hundred thousand times or more.

Currently, some file systems have mechanisms to eliminate copies, but none can accomplish this operation in a short amount of time which, in technical terms, means the system factors copies in O(l) ("on the order of constant time") time, even as the system scales. This means a unit of time that is constant as opposed to other systems that would require O(N**2), O(N) or O(log(N)) time, meaning time is related to the amount of storage being factored. Factoring storage in non-constant time may be marginally satisfactory for systems where the amount of storage is small, but as a system grows to large sizes, even the most efficient non-constant factoring systems become untenable. The hash file system of the present invention is designed to factor storage on a scale never previously attempted and in a first implementation, is capable of factoring 2 million petabytes of storage, with the ability to expand to much larger sizes. Existing file systems are incapable of managing data on such scales.

Moreover, the hash file system of the present invention may be utilized to provide inexpensive, global computer system data protection and backup. Its factoring function operates very efficiently on typical backup data sets because computer file systems rarely change more than a few percent of their overall storage between each backup operation. Further, the hash file system of the present invention can serve as the basis for an efficient messaging (e-mail) system. E-mail systems are fundamentally data copying mechanisms wherein an author writes a message and sends it to a list of recipients. An e-mail system implements this "sending" operation effectively by copying the data from one place to another. The author generally keeps copies of the messages he sends and the recipients each keep their own copies. These copies are often, in turn, attached in replies that are also kept (i.e. copies of copies). The commonality factoring feature of the present invention can eliminate this gross inefficiency while transparently allowing e-mail users to retain this familiar copy-oriented paradigm.

Because, as previously noted, most data in computer systems rarely change, the hash file system of the present invention allows for the reconstruction of complete snapshots of entire systems which can be kept, for example, for every hour of every day they exist or even continuously, with snapshots taken at even minute (or less) intervals depending on the system needs. Further, since conventional computer systems often provide limited versioning of files (i.e. Digital Equipment Corporation's VAX® VMS® file system), the hash file system of the present invention also provides significant advantages in this regard. Versioning in conventional systems presents both good and bad aspects. In the former instance, it helps prevent accidents, but, in the latter, it requires regular purging to reduce the disk space it consumes. The hash file system of the present invention provides versioning of files with little overhead through the factoring of identical copies or edited copies with little extra space. For example, saving one hundred revisions of a typical document typically requires about one hundred times the space of the original file. Using the hash file system disclosed herein, those revisions might require only three times the space of the original (depending on the document's size, the degree and type of editing, and external factors).

Still other potential applications of the hash file system of the present invention include web-serving. In this regard, the hash file system can be used to efficiently distribute web content because the method of factoring commonality (hashing) also produces uniform distribution over all hash file system servers. This even distribution permits a large array of servers to function as a gigantic web server farm with an evenly distributed load. In other applications, the hash file system of the present invention can be used as a network accelerator inasmuch as it can be used to reduce network traffic by sending proxies (hashes) for data instead of the data itself. A large percentage of current network traffic is redundant data moving between locations. Sending proxies for the data would allow effective local caching mechanisms to operate, possibly reducing the traffic on the Internet by several orders of magnitude.

As particularly disclosed herein, the hash file system and method of the present invention may be implemented using 160 bit hashsums as universal pointers. This differs from conventional file systems which use pointers assigned from a central authority (i.e. in Unix a 32 bit "vinode" is assigned by the kernel's file systems in a lock-step operation to assure uniqueness). In the hash file system of the present invention, these 160 bit hashsums are assigned without a central authority (i.e. without locking, without synchronization) by a hashing algorithm.

Known hashing algorithms produce probabilistically unique numbers that uniformly span a range of values. In the case of the hash function SHA-1, that range is between 0 and $10e^{48}$. This hashing operation is done by examining only the contents of the data being stored and, therefore, can be done in complete isolation, asynchronously, and without interlocking.

Hashing is an operation that can be verified by any component of the system, eliminating the need for trusted operations across those components. The hash file system and method of the present invention disclosed herein is, therefore, functional to eliminate the critical bottleneck of conventional large scale distributed file systems, that is, a trusted encompassing central authority. It permits the construction of a large scale distributed file system with no limits on simultaneous read/write operations, that can operate without risk of incoherence and without the limitation of certain conventional bottlenecks.

BRIEF DESCRIPTION OF THE DRAWINGS

The aforementioned and other features and objects of the present invention and the manner of attaining them will become more apparent, and the invention itself will be best understood by reference to the following description of a preferred embodiment taken in conjunction with the accompanying drawings, wherein:

FIG. 10 is a simplified diagram illustrative of a hash file system address translation function for an exemplary 160 bit hash value;

FIG. 11 is a simplified exemplary illustration of an index stripe splitting function for use with the system and method of the present invention;

DESCRIPTION OF A REPRESENTATIVE EMBODIMENT

Figure 1:
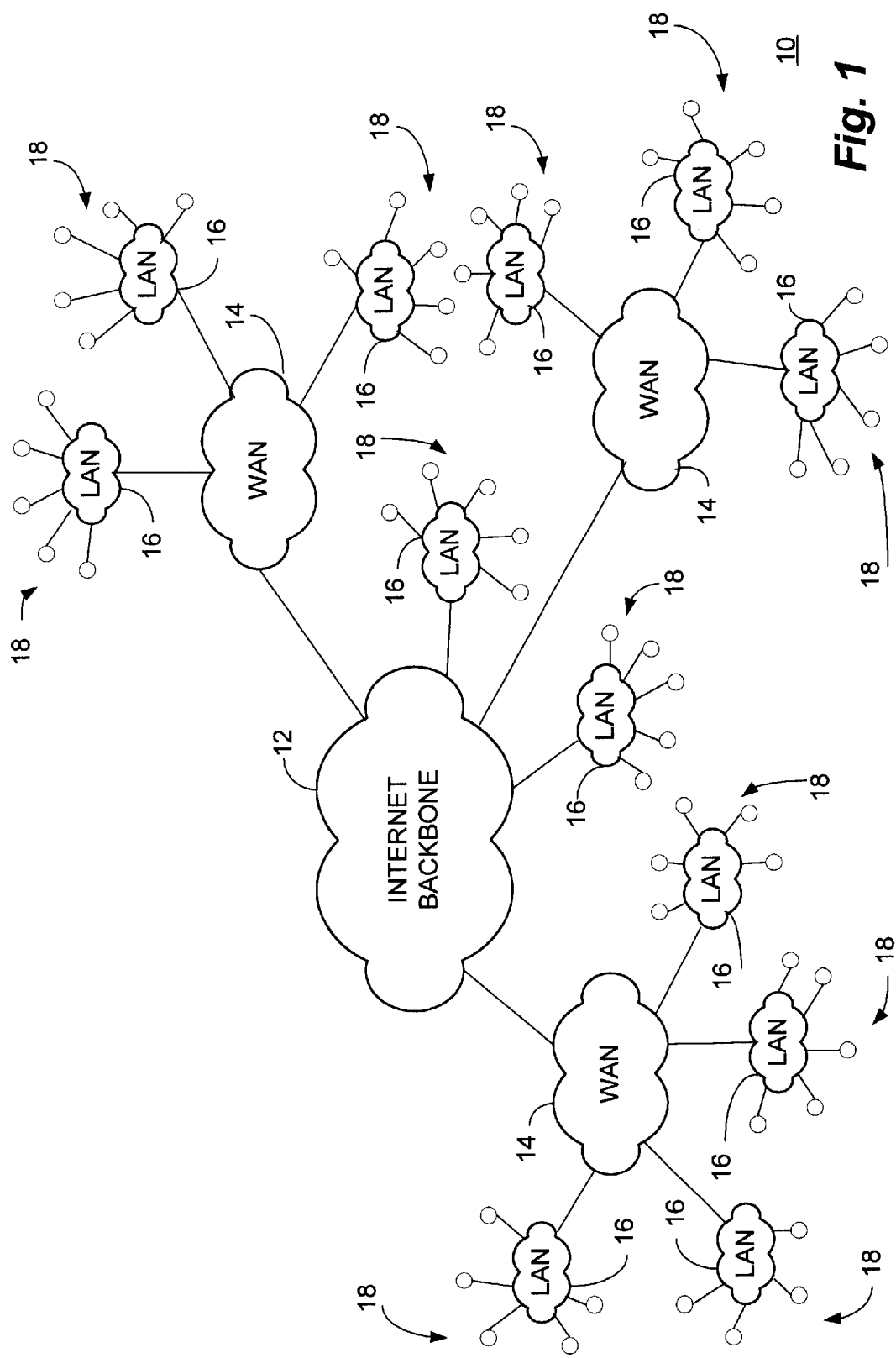
FIG. 1 is a high level illustration of a representative networked computer environment in which the system and method of the present invention may be implemented.

In a particular implementation of the hash file system and method of the present invention as disclosed herein, its application is directed toward a high availability, high reliability data storage system that leverages rapid advances in commodity computing devices and the robust nature of internetwork technology such as the Internet. Particularly disclosed herein is a hash file system that manages the correspondence of one or more block(s) of data (including but not limited to files, directories, drive images, software applications, digitized voice, and rich media content) together with one or more symbol(s) for that block of data, wherein the symbol may be a number, hash, checksum, binary sequence, or other identifier that is derived from the block of data itself and is statistically, probabilistically, or otherwise effectively unique to that block of data. The system itself works on any computer system including, without limitation: personal computers; supercomputers; distributed or non-distributed networks; storage area networks ("SAN") using IDE, SCSI or other disk buses; network attached storage ("NAS") or other systems capable of storing and/or processing data.

In a particular implementation of the hash file system disclosed herein, the symbol(s) may be derived using one or more hash or checksum generating engines, programs, or algorithms, including but not limited to MD4, MD5, SHA, SHA-1, or their derivatives. Further, the symbol(s) may comprise parts of variable or invariable length symbols derived using a hash or checksum generating engine, program, or algorithm, including but not limited to MD4, MD5, SHA, SHA-1, or other methods of generating probabilistically unique identifiers based on data content. In a particular implementation disclosed herein, file seeks, or lookups for retrieving data or checking on the existence/availability of data, may be accelerated by looking at all or a smaller portion of the symbol, with the symbol portion indicating or otherwise providing the routing information for finding, retrieving, or checking on the existence/availability of the data.

Further disclosed herein is a system and method for a hash file system wherein the symbols allow for the identification of redundant copies within the system and/or allow for the identification of copies within the system redundant with data presented to the system for filing and storage. The symbols allow for the elimination of, or allow for the screening of, redundant copies of the data and/or parts of the data in the system or in data and/or parts of data presented to the system, without loss of data integrity and can provide for the even distribution of data over available storage for the system. The system and method of the present invention as disclosed herein requires no central operating point and balances processing and/or input/output ("I/O") load across all computers, supercomputers, or other devices capable of storing and/or processing data attached to the system. The screening of redundant copies of the data and/or parts of the data provided herein allows for the creation, repetitive creation, or retention of intelligent boundaries for screening other data in the system, future data presented to the system, or future data stored by the system.

The present invention is illustrated and described in terms of a distributed computing environment such as an enterprise computing system using public communication channels such as the Internet. However, an important feature of the present invention is that it is readily scaled upwardly and downwardly to meet the needs of a particular application. Accordingly, unless specified to the contrary the present invention is applicable to significantly larger, more complex network environments as well as small network environments such as conventional LAN systems.

With reference now to FIG. 1, the present invention may be utilized in conjunction with a novel data storage system on a network 10. In this figure, an exemplary internetwork environment 10 may include the Internet which comprises a global internetwork formed by logical and physical connection between multiple wide area networks ("WANs") 14 and local area networks ("LANs") 16. An Internet backbone 12 represents the main lines and routers that carry the bulk of the data traffic. The backbone 12 is formed by the largest networks in the system that are operated by major Internet service providers ("ISPs") such as GTE, MCI, Sprint, UUNet, and America Online, for example. While single connection lines are used to conveniently illustrate WANs 14 and LANs 16 connections to the Internet backbone 12, it should be understood that in reality, multi-path, routable physical connections exist between multiple WANs 14 and LANs 16. This makes internetwork 10 robust when faced with single or multiple failure points.

It is important to distinguish network connections from internal data pathways implemented between peripheral devices within a computer. A "network" comprises a system of general purpose, usually switched physical connections that enable logical connections between processes operating on nodes 18. The physical connections implemented by a network are typically independent of the logical connections that are established between processes using the network. In this manner, a heterogeneous set of processes ranging from file transfer, mail transfer, and the like can use the same physical network. Conversely, the network can be formed from a heterogeneous set of physical network technologies that are invisible to the logically connected processes using the network. Because the logical connection between processes implemented by a network is independent of the physical connection, internetworks are readily scaled to a virtually unlimited number of nodes over long distances.

In contrast, internal data pathways such as a system bus, peripheral component interconnect ("PCI") bus, Intelligent Drive Electronics ("IDE") bus, small computer system interface ("SCSI") bus, and the like define physical connections that implement special-purpose connections within a computer system. These connections implement physical connections between physical devices as opposed to logical connections between processes. These physical connections are characterized by limited distance between components, limited number of devices that can be coupled to the connection, and constrained format of devices that can be connected over the connection.

In a particular implementation of the present invention, storage devices may be placed at nodes 18. The storage at any node 18 may comprise a single hard drive, or may comprise a managed storage system such as a conventional RAID device having multiple hard drives configured as a single logical volume. Significantly, the present invention manages redundancy operations across nodes, as opposed to within nodes, so that the specific configuration of the storage within any given node is less relevant. Optionally, one or more of the nodes 18 may implement storage allocation management ("SAM") processes that manage data storage across nodes 18 in a distributed, collaborative fashion. SAM processes preferably operate with little or no centralized control for the system as whole. SAM processes provide data distribution across nodes 18 and implement recovery in a fault-tolerant fashion across network nodes 18 in a manner similar to paradigms found in RAID storage subsystems.

However, because SAM processes operate across nodes rather than within a single node or within a single computer, they allow for greater fault tolerance and greater levels of storage efficiency than conventional RAID systems. For example, SAM processes can recover even where a network node 18, LAN 16, or WAN 14 become unavailable. Moreover, even when a portion of the Internet backbone 12 becomes unavailable through failure or congestion, the SAM processes can recover using data distributed on nodes 18 that remain accessible. In this manner, the present invention leverages the robust nature of internetworks to provide unprecedented availability, reliability, fault tolerance and robustness.

Figure 2:
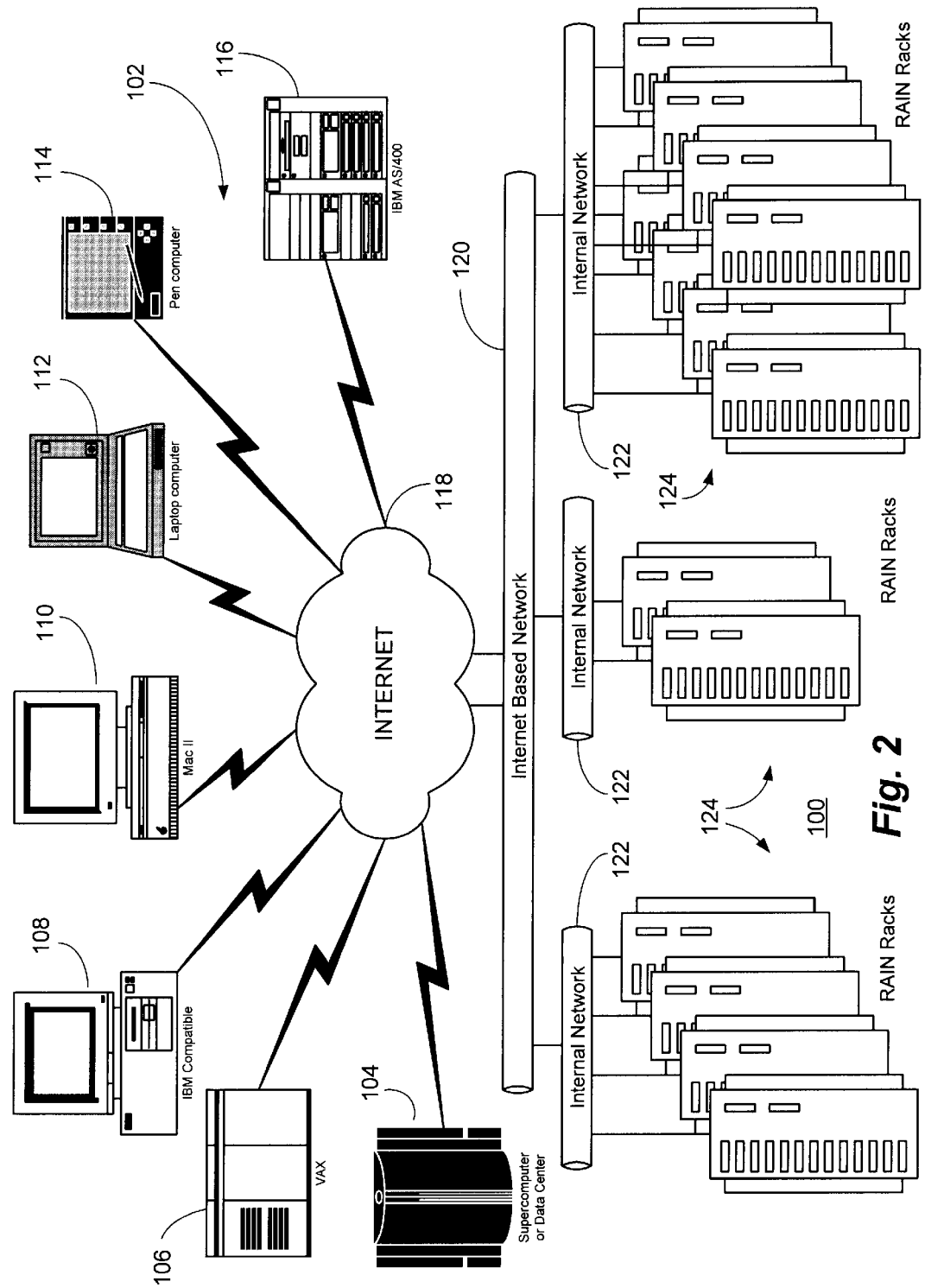
FIG. 2 is a more detailed conceptual representation of a possible operating environment for utilization of the system and method of the present invention wherein files maintained on any number of computers or data centers may be stored in a decentralized computer system through an Internet connection to a number of Redundant Arrays of Independent Nodes ("RAIN") racks located, for example, at geographically diverse locations.

With reference additionally now to FIG. 2, a more detailed conceptual view of an exemplary network computing environment in which the present invention is implemented is depicted. The internetwork 10 of the preceding figure (or Internet 118 in this figure) enables an interconnected network 100 of a heterogeneous set of computing devices and mechanisms 102 ranging from a supercomputer or data center 104 to a hand-held or pen-based device 114. While such devices have disparate data storage needs, they share an ability to retrieve data via network 100 and operate on that data within their own resources. Disparate computing devices 102 including mainframe computers (e.g., VAX station 106 and IBM AS/400 station 116) as well as personal computer or workstation class devices such as IBM compatible device 108, Macintosh device 110 and laptop computer 112 are readily interconnected via internetwork 10 and network 100. Although not illustrated, mobile and other wireless devices may be coupled to the internetwork 10.

Internet-based network 120 comprises a set of logical connections, some of which are made through Internet 118, between a plurality of internal networks 122. Conceptually, Internet-based network 120 is akin to a WAN 14 (FIG. 1) in that it enables logical connections between geographically distant nodes. Internet-based networks 120 may be implemented using the Internet 118 or other public and private WAN technologies including leased lines, Fibre Channel, and the like.

Similarly, internal networks 122 are conceptually akin to LANs 16 (FIG. 1) in that they enable logical connections across a more limited distance than WAN 14. Internal networks 122 may be implemented using various LAN technologies including Ethernet, Fiber Distributed Data Interface ("FDDI"), Token Ring, Appletalk, Fibre Channel, and the like.

Each internal network 122 connects one or more redundant arrays of independent nodes (RAIN) elements 124 to implement RAIN nodes 18 (FIG. 1). Each RAIN element 124 comprises a processor, memory, and one or more mass storage devices such as hard disks. RAIN elements 124 also include hard disk controllers that may be conventional IDE or SCSI controllers, or may be managing controllers such as RAID controllers. RAIN elements 124 may be physically dispersed or co-located in one or more racks sharing resources such as cooling and power. Each node 18 (FIG. 1) is independent of other nodes 18 in that failure or unavailability of one node 18 does not affect availability of other nodes 18, and data stored on one node 18 may be reconstructed from data stored on other nodes 18.

In a particular exemplary implementation, the RAIN elements 124 may comprise computers using commodity components such as Intel-based microprocessors mounted on a motherboard supporting a PCI bus and 256 megabytes of random access memory ("RAM") housed in a conventional AT or ATX case. SCSI or IDE controllers may be implemented on the motherboard and/or by expansion cards connected to the PCI bus. Where the controllers are implemented only on the motherboard, a PCI expansion bus may be optionally used. In a particular implementation, the motherboard may implement two mastering EIDE channels and a PCI expansion card which is used to implement two additional mastering EIDE channels so that each RAIN element 124 includes up to four or more EIDE hard disks. In the particular implementation, each hard disk may comprise an 80 gigabyte hard disk for a total storage capacity of 320 gigabytes or more per RAIN element. The hard disk capacity and configuration within RAIN elements 124 can be readily increased or decreased to meet the needs of a particular application. The casing also houses supporting mechanisms such as power supplies and cooling devices (not shown).

Each RAIN element 124 executes an operating system. In a particular implementation, the UNIX or UNIX variant operating system such as Linux may be used. It is contemplated, however, that other operating systems including DOS, Microsoft Windows, Apple Macintosh OS, OS/2, Microsoft Windows NT and the like may be equivalently substituted with predictable changes in performance. The operating system chosen forms a platform for executing application software and processes, and implements a file system for accessing mass storage via the hard disk controller(s). Various application software and processes can be implemented on each RAIN element 124 to provide network connectivity via a network interface using appropriate network protocols such as user datagram protocol ("UDP"), transmission control protocol (TCP), Internet protocol (IP) and the like.

Figure 3:
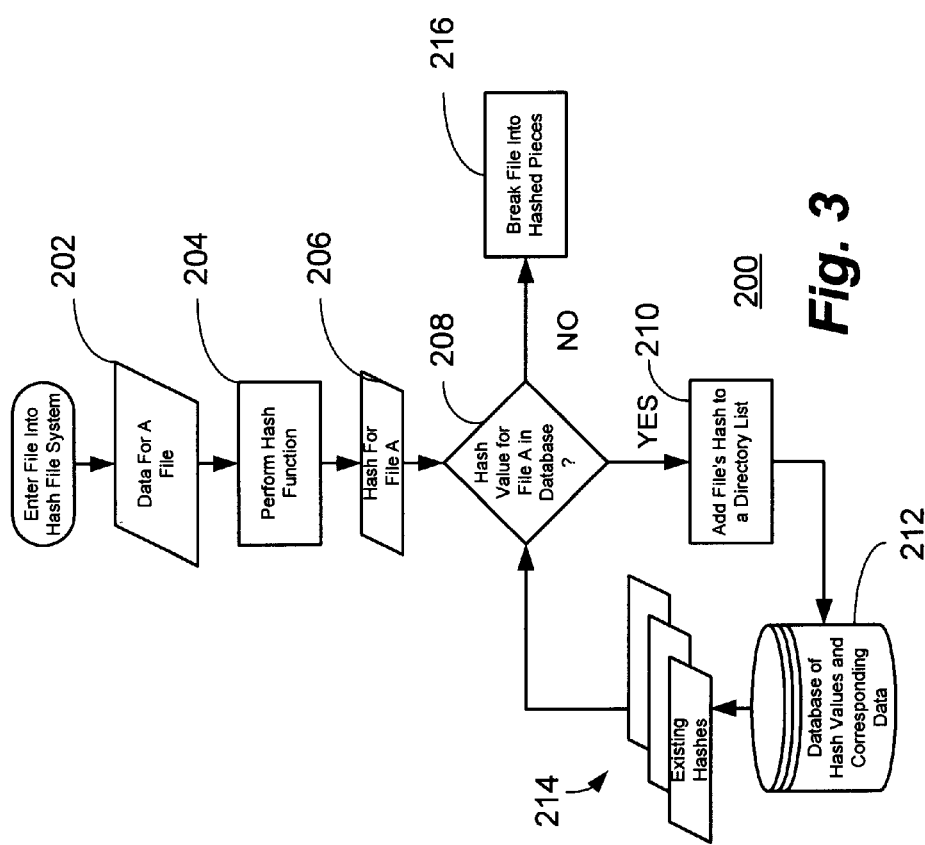
FIG. 3 is a logic flow chart depicting the steps in the entry of a computer file into the hash file system of the present invention wherein the hash value for the file is checked against hash values for files previously maintained in a set, or database.

With reference additionally now to FIG. 3, a logic flow chart is shown depicting the steps in the entry of a computer file into the hash file system of the present invention and wherein the hash value for the file is checked against hash values for files previously maintained in a set, or database.

The process 200 begins by entry of a computer file data 202 (e.g. "File A") into the hash file system ("HFS") of the present invention upon which a hash function is performed at step 204. The data 206 representing the hash of File A is then compared to the contents of a set containing hash file values at decision step 208. If the data 206 is already in the set, then the file's hash value is added to a directory list at step 210. The contents of the set 212 comprising hash values and corresponding data is provided in the form of existing hash values 214 for the comparison operation of decision step 208. On the other hand, if the hash value for File A is not currently in the set, the file is broken into hashed pieces (as will be more fully described hereinafter) at step 216.

Figure 4:
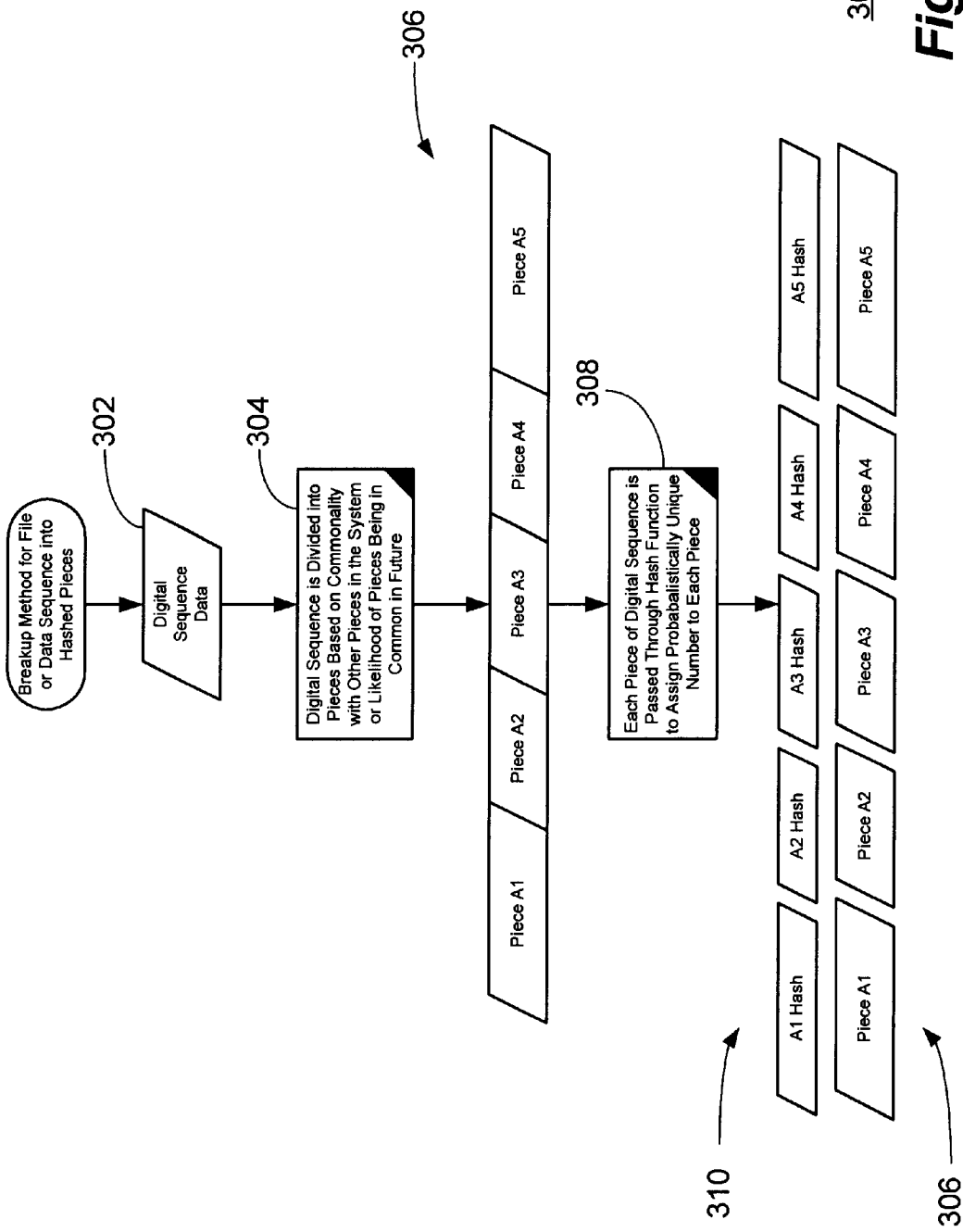
FIG. 4 is a further logic flow chart depicting the steps in the breakup of a file or other data sequence into hashed pieces resulting in the production of a number of data pieces as well as corresponding probabilistically unique hash values for each piece.

With reference additionally now to FIG. 4, a further logic flow chart is provided depicting the steps in the process 300 for breakup of a digital sequence (e.g. a file or other data sequence) into hashed pieces. This process 300 ultimately results in the production of a number of data pieces as well as corresponding probabilistically unique hash values for each piece.

The file data 302 is divided into pieces based on commonality with other pieces in the system or the likelihood of pieces being found to be in common in the future at step 304. The results of the operation of step 304 upon the file data 302 is, in the representative example shown, the production of four file pieces 306 denominated A1 through A5 inclusively. Each of the file pieces 306 is then operated on at step 308 by placing it through individual hash function operations to assign a probabilistically unique number to each of the pieces 306 A1 through A5. The results of the operation at step 308 is that each of the pieces 306 (A1 through A5) has an associated, probabilistically unique hash value 310 (shown as A1 Hash through A5 Hash respectively). The file division process of step 304 is described in greater detail hereinafter in conjunction with the unique "sticky byte" operation also disclosed herein.

Figure 5:
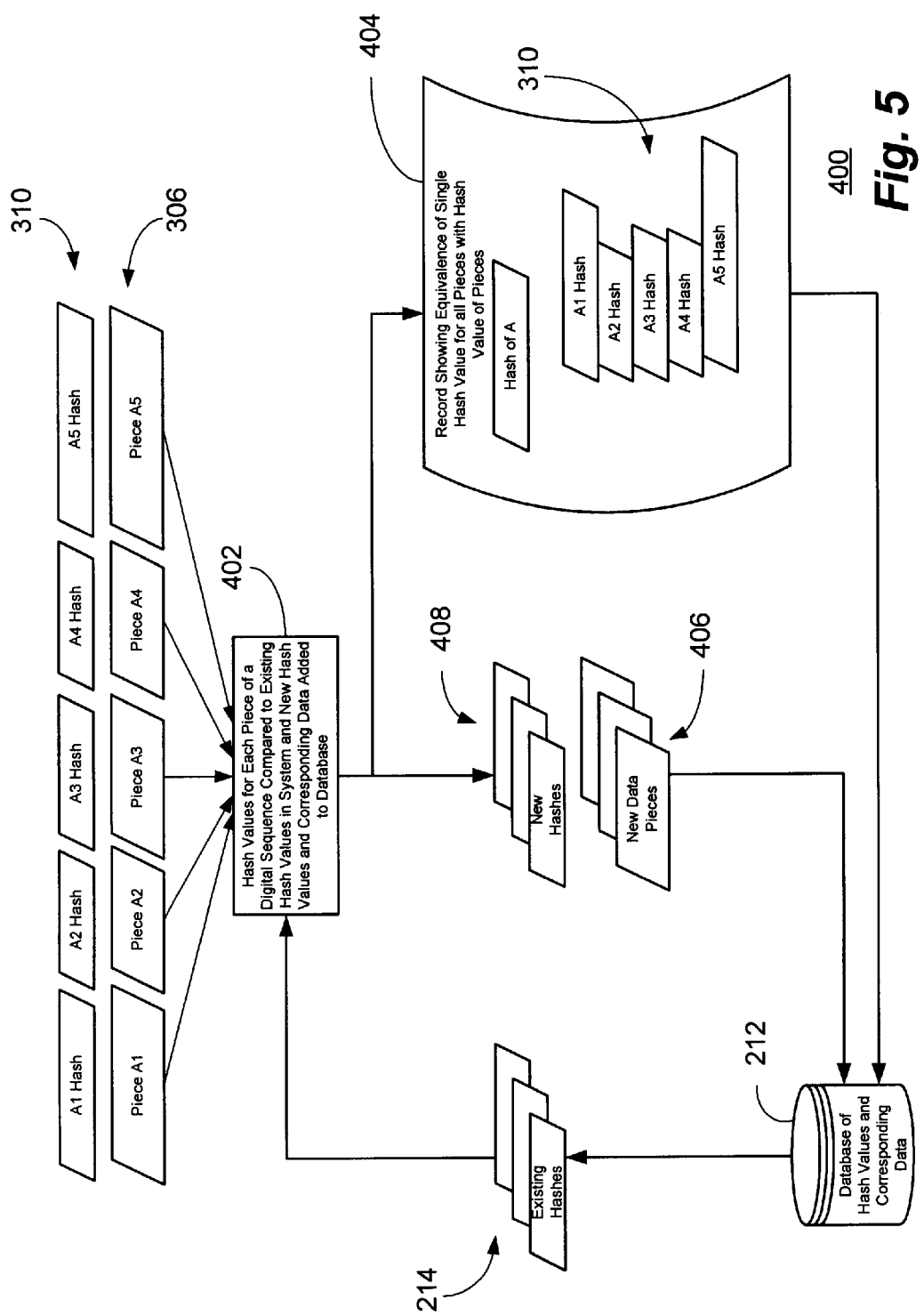
FIG. 5 is another logic flow chart depicting the comparison of the hash values for each piece of a file to existing hash values in the set (or database), the production of records showing the equivalence of a single hash value for all file pieces with the hash values of the various pieces and whereupon new data pieces and corresponding new hash values are added to the set.

With reference additionally now to FIG. 5, another logic flow chart is shown depicting a comparison process 400 for the hash values 310 of each piece 306 of the file to those of existing hash values 214 maintained in the set 212. Particularly, at step 402, the hash values 310 for each piece 306 of the file are compared to existing hash values 214 and new hash values 408 and corresponding new data pieces 406 are added to the set 212. In this way, hash values 408 not previously present in the database set 212 are added together with their associated data pieces 406. The process 400 also results in the production of records 404 showing the equivalence of a single hash value for all file pieces with the hash values 310 of the various pieces 306.

Figure 6:
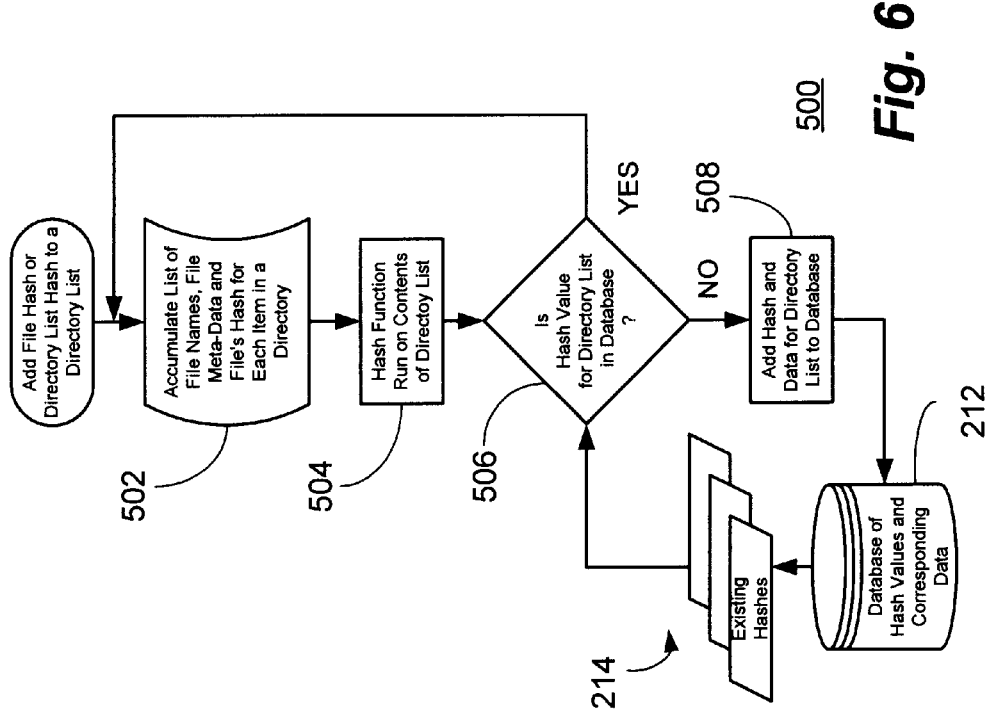
FIG. 6 is yet another logic flow chart illustrating the steps in the comparison of file hash or directory list hash values to existing directory list hash values and the addition of new file or directory list hash values to the set directory list.

With reference additionally now to FIG. 6, yet another logic flow chart is shown illustrating a process 500 for the comparison of file hash or directory list hash values to existing directory list hash values and the addition of new file or directory list hash values to the database directory list. The process 500 operates on stored data 502 which comprises an accumulated list of file names, file meta-data (e.g. date, time, file length, file type etc.) and the file's hash value for each item in a directory. At step 504, the hash function is run upon the contents of the directory list. Decision step 506 is operative to determine whether or not the hash value for the directory list is in the set 212 of existing hash values 214. If it is, then the process 500 returns to add another file hash or directory list hash to a directory list. Alternatively, if the hash value for the directory list is not already in the database set 212, the hash value and data for the directory list are added to the database 212 set at step 508.

Figure 7:
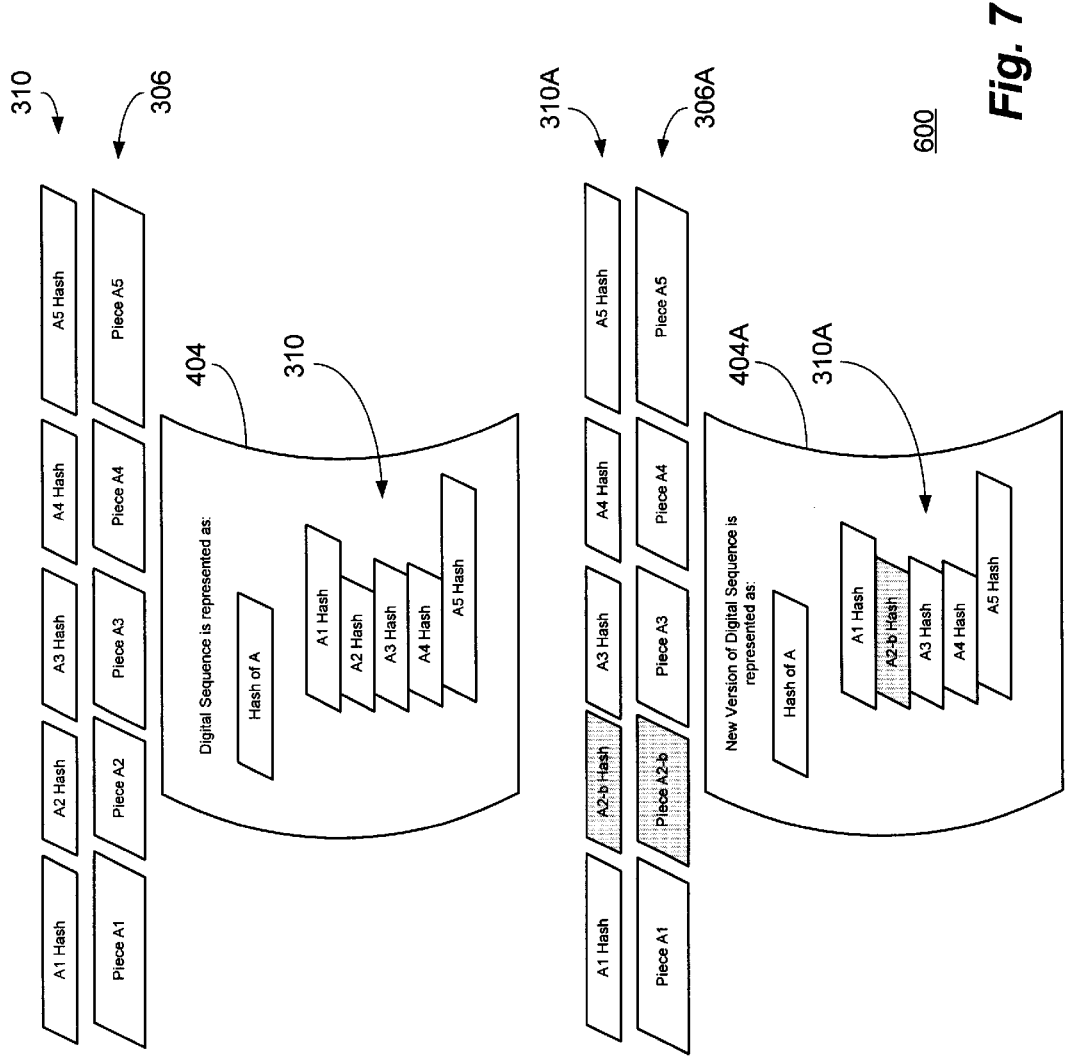
FIG. 7 is a comparison of the pieces of a representative computer file with their corresponding hash values both before and after editing of a particular piece of the exemplary file.

With reference additionally now to FIG. 7, a comparison 600 of the pieces 306 of a representative computer file (i.e.

"File A") with their corresponding hash values 310 is shown both before and after editing of a particular piece of the exemplary file. In this example, the record 404 contains the hash value of File A as well as the hash values 310 of each of the pieces of the file A1 through A5. A representative edit of the File A may produce a change in the data for piece A2 (now represented by A2-*b*) of the file pieces 306A along with a corresponding change in the hash value A2-*b* of the hash values 310A. The edited file piece now produces an updated record 404A which includes the modified hash value of File A and the modified hash value of piece A2-*b*.

Figure 8:
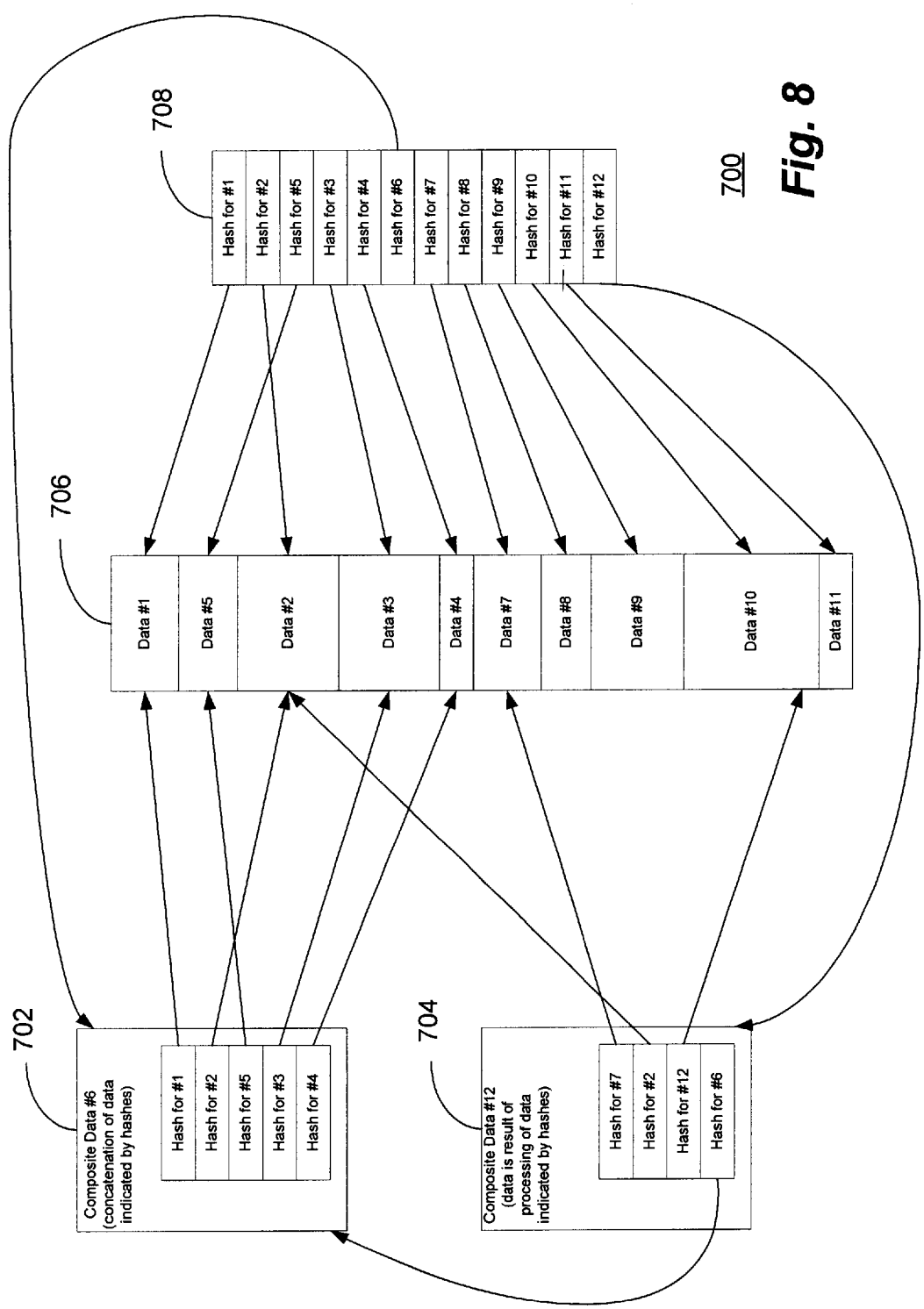
FIG. 8 is a conceptual representation of the fact that composite data which may be derived by means of the system and method of the present invention is effectively the same as the data represented explicitly but may instead be created by a "recipe" such as the concatenation of data represented by its corresponding hashes or the result of a function using the data represented by the hashes.

With reference additionally now to FIG. 8, a conceptual representation 700 is shown illustrative of the fact that composite data (such as composite data 702 and 704) derived by means of the system and method of the present invention, is effectively the same as the data 706 represented explicitly but is instead created by a "recipe", or formula. In the example shown, this recipe includes the concatenation of data represented by its corresponding hashes 708 or the result of a function using the data represented by the hashes. The data blocks 706 may be variable length quantities as shown and the hash values 708 are derived from their associated data blocks. As previously stated, the hash values 708 are a probabilistically unique identification of the corresponding data pieces but truly unique identifications can be used instead or intermixed therewith. It should also be noted that the composite data 702, 704 can also reference other composite data many levels deep while the hash values 708 for the composite data can be derived from the value of the data the recipe creates or the hash value of the recipe itself.

Figure 9:
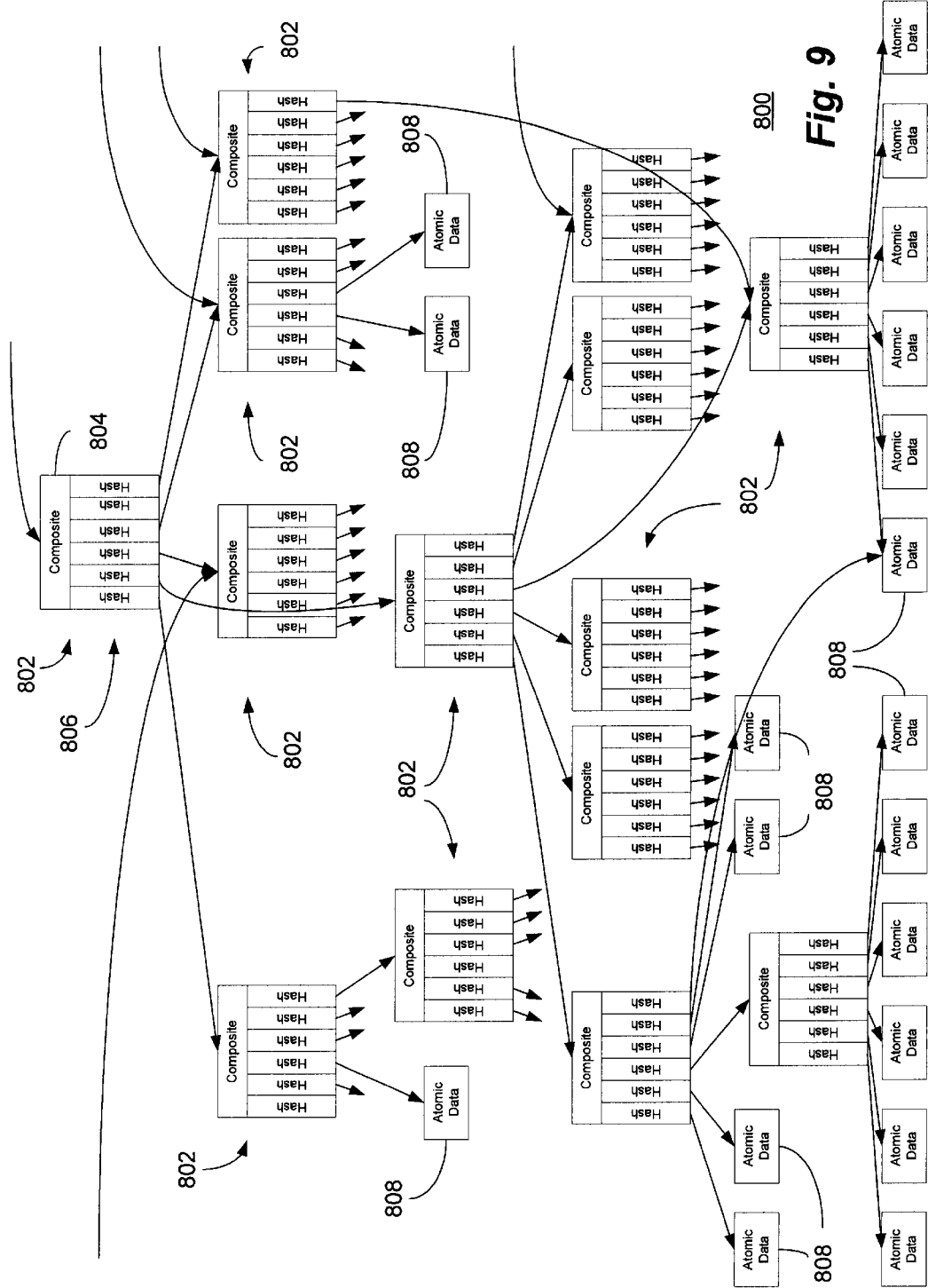
FIG. 9 is another conceptual representation of how the hash file system and method of the present invention my be utilized to organize data to optimize the reutilization of redundant sequences through the use of hash values as pointers to the data they represent and wherein data may be represented either as explicit byte sequences (atomic data) or as groups of sequences (composites)

With reference additionally now to FIG. 9, another conceptual representation 800 is shown of how the hash file system and method of the present invention may be utilized to organize data 802 to optimize the reutilization of redundant sequences through the use of hash values 806 as pointers to the data they represent and wherein data 802 may be represented either as explicit byte sequences (atomic data) 808 or as groups of sequences (composites) 804.

The representation 800 illustrates the tremendous commonality of recipes and data that gets reused at every level. The basic structure of the hash file system of the present invention is essentially that of a "tree" or "bush" wherein the hash values 806 are used instead of conventional pointers. The hash values 806 are used in the recipes to point to the data or another hash value that could also itself be a recipe. In essence then, recipes can point to other recipes that point to still other recipes that ultimately point to some specific data that may, itself, point to other recipes that point to even more data, eventually getting down to nothing but data.

With reference additionally now to FIG. 10, a simplified diagram 900 is shown illustrative of a hash file system address translation function for an exemplary 160 bit hash value 902. The hash value 902 includes a data structure comprising a front portion 904 and a back portion 906 as shown and the diagram 900 illustrates a particular "0 of 1" operation that is used for enabling the use of the hash value 902 to go to the location of the particular node in the system that contains the corresponding data.

The diagram 900 illustrates how the front portion 904 of the hash value 902 data structure may be used to indicate the hash prefix to stripe identification ("ID") 908 and how that is, in turn, utilized to map the stripe ID to IP address and the ID class to IP address 910. In this example, the "S2" indicates stripe 2 of index Node 37 912. The index stripe 912 of Node 37 then indicates stripe 88 of data Node 73 indicated by the reference numeral 914. In operation then, a portion of the hash value 902 itself may be used to indicate which node in the system contains the relevant data, another portion of the hash value 902 may be used to indicate which stripe of data at that particular node and yet another portion of the hash value 902 to indicate where within that stripe the data resides. Through this three step process, it can rapidly be determined if the data represented by the hash value 902 is already present in the system.

With reference additionally now to FIG. 11, a simplified exemplary illustration of an index stripe splitting function 1000 is shown for use with the system and method of the present invention. In this illustration, an exemplary function 1000 is shown that may be used to effectively split a stripe 1002 (S2) into two stripes 1004 (S2) and 1006 (S7) should one stripe become too full. In this example, the odd entries have been moved to stripe 1006 (S7) while the even ones remain in stripe 1004. This function 1000 is one example of how stripe entries may be handled as the overall system grows in size and complexity.

Figures 12, 13:
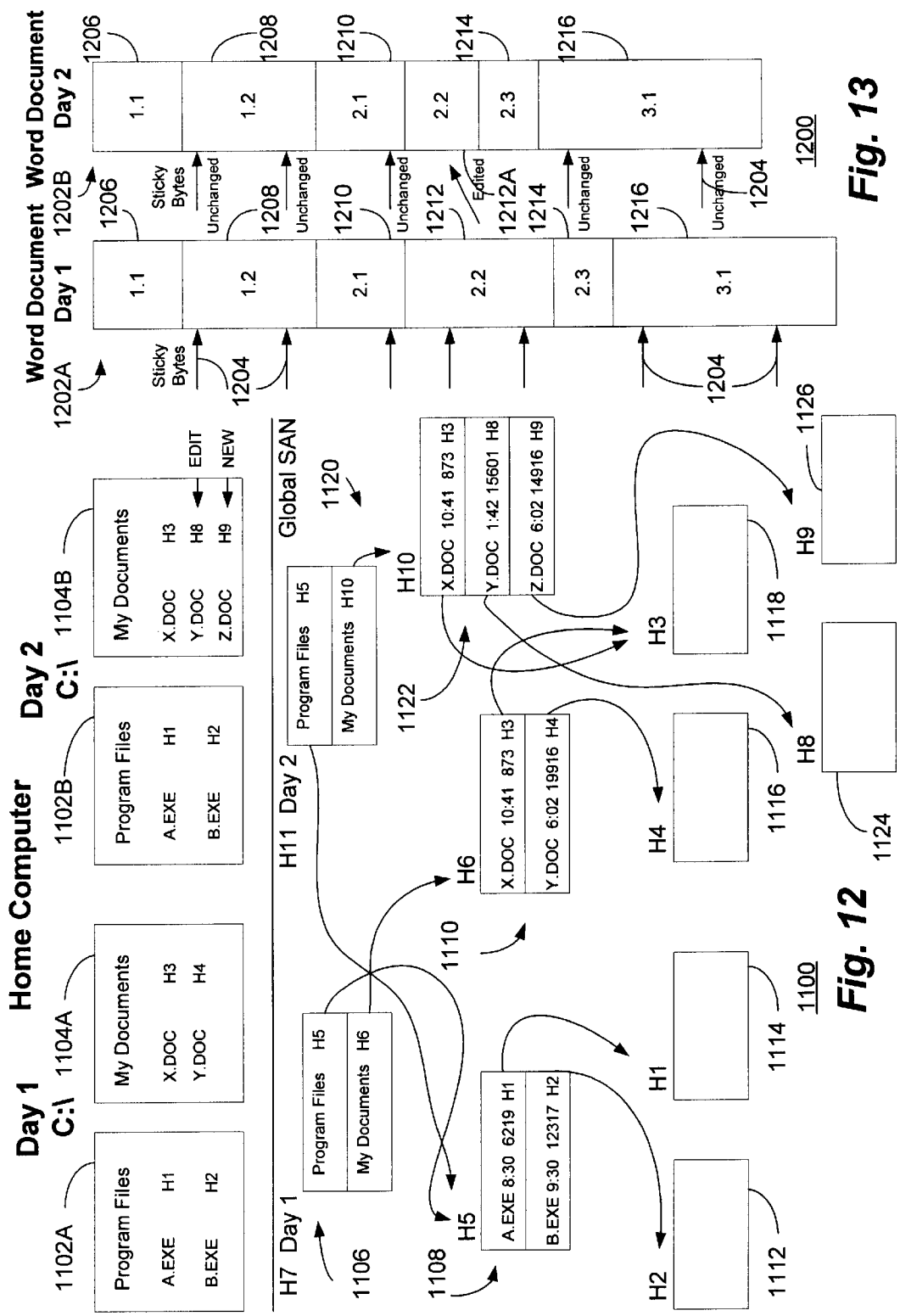
FIG. 12 is a simplified illustration of the overall functionality of the system and method of the present invention for use in the backup of data for a representative home computer having a number of program and document files on Day 1 and wherein one of the document files is edited on Day 2 together with the addition of a third document file.
FIG. 13 illustrates the comparison of various pieces of a particular document file marked by a number of "sticky bytes" both before and following editing wherein one of the pieces is thereby changed while other pieces remain the same.

With reference additionally now to FIG. 12, a simplified illustration 1100 of the overall functionality of the system and method of the present invention is shown for use, for example, in the backup of data for a representative home computer having a number of program and document files 1102A and 1104A on Day 1 and wherein the program files 1102B remain the same on Day 2 while one of the document files 1104B is edited on Day 2 (Y.doc) together with the addition of a third document file (Z.doc).

The illustration 1100 shows the details of how a computer file system may be broken into pieces and then listed as a series of recipes on a global data protection network ("gDPN") to reconstruct the original data from the pieces. This very small computer system is shown in the form of a "snapshot" on "Day 1 " and then subsequently on "Day 2". On "Day 1", the "program files H5" and "my documents H6" are illustrated by numeral 1106, with the former being represented by a recipe 1108 wherein a first executable file is represented by a hash value H1 1114 and a second represented by a hash value H2 1112. The document files are represented by hash value H6 1110 with the first document being represented by hash value H3 1118 and the second by hash value H4 1116. Thereafter on "Day 2 ", the "program files H5" and "my documents" H10 indicated by numeral 1120 show that the "program files H5" have not changed, but the "my document H10" have. H10 indicated by numeral 1122 shows the "X.doc" is still represented by hash value H3 1118 while "Y.doc" is now represented by hash value H8 at number 1124. New document file "Z.doc" is now represented by hash value H9 at numeral 1126.

In this example, it can be seen that on Day 2, some of the files have changed, while others have not. In the files that have changed, some of the pieces of them have not changed while other pieces have. Through the use of the hash file system of the present invention, a "snap shot" of the computer system can be made on Day 1 (producing the necessary recipes for reconstruction of the computer files as they exist then) and then on Day 2 through the reuse of some of the previous day's recipes together with the reformulation of others and the addition of new ones to describe the system at that time. In this manner, the computer system may be recreated in its entirety at any point in time on both Day 1 or Day 2 as well as on any subsequent day.

With reference additionally now to FIG. 13, a comparison 1200 of various pieces of a particular document file marked by a number of "sticky bytes" 1204 is shown both before (Day 1 1202A) and following editing (Day 2 1202B) wherein one of the pieces is thereby changed while other pieces remain the same. For example, on Day 1, file 1202A comprises variable length pieces 1206 (1.1), 1208 (1.2), 1210 (2.1), 1212 (2.), 1214 (2.3) and 1216 (3.1). On Day 2, pieces 1206, 1208, 1210, 1214 and 1216 remain the same (thus having the same hash values) while piece 1212 has now been edited to produce piece 1212A (thus having a differing hash value).

Data sticky bytes (or "sticky points") are a unique, fully automated way to sub-divide computer files such that common elements may be found on multiple related and unrelated computers without the need for communication between the computers. The means in which data sticky points are found is completely mathematical in nature and performs equally well regardless of the data content of the files. In the hash file system of the present invention, all data objects may be indexed, stored and retrieved using, for example (but not limited to), an industry standard checksum such as: MD4, MD5, SHA, or SHA-1. In operation, if two files have the same checksum, it may be considered to be highly likely that they are the same file. Using the system and method disclosed herein, data sticky points may be produced with a standard mathematical distribution and with standard deviations that are a small percentage of the target size.

A data sticky point is a statistically infrequent arrangement of n bytes. In this case, an example is given with 32 bytes because of its ease in implementation in current microprocessor technology.

A rolling hash of 32 bits could be generated for the file "f".
//f[i]=is the ith byte of the file "f".
//scramble is a 256 entry array of integers with each
//being 32 bits wide;
//these integers are typically chosen to uniformly
//span the range.
int t=8 //target number of trailing zeros
int hash=0;
int sticky_bits;
for(int i=O; i<filesize; i++) hash=hash>>1|scramble[f[i]];
//At every byte in the file, hash represents the
//rolling hash of the file.
   sticky_bits=(hash−1)^hash;
//sticks_bits is a variable which will have the
//number of ones in the hash
//that correspond to the number of trailing zeros in
//the "hash".
   number_of_bits=count_ones(stick-bits);
   if(number_of_bits>t) output_sticky_point(i);
}

A sticky point is defined to be a rolling hash with at least the number of trailing zeros as the target number with the hash represented in binary. Statistically speaking, this algorithm will find points that are spaced at 2t, where t is the target number of trailing zeros. For this example where t=8, the algorithm will find, on average, sticky points that are spaced at 2^8=256 bytes apart.

A rolling hash of 32 bits may be generated for the f file where:
f[i]=is the ith byte of the file f.
scramble is a 256 entry array of random elements with each being n bits wide;
int t=8//target number of trailing zeros
int target_distance=256;//2 to the power of 8
int hash=0;
int sticky_bits;
int distance=0;
int last_point=0;
   for(int i=O; i<filesize; i++) hash=hash>>1| scramble[f[i]];
//At every byte in the file hash represents the //rolling hash of the file.
   sticky_bits=(hash−1)^hash;
//sticks_bits is a variable which will have the //number of ones that correspond to the number of //trailing zeros in the "hash".
   number_of_bits=count_ones(stick_bits);
   distance=i-last_point;
if(number_of_bits*distance/target_distance>t) last_point=i; output_sticky_point(i);
   }
}

While the hashing function utilized to implement the hash file system of the present invention requires a moderately complex computation, it is well within the capability of present day computer systems. Hashing functions are inherently probabilistic and any hashing function might possibly produce incorrect results when two different data objects happen to have the same hash value. However, the system and method herein disclosed mitigates this problem by using well known and researched hashing functions that reduce the probability of collision down to levels acceptable for reliable use (i.e. one chance in a trillion trillion), far less than the error rates otherwise tolerated in conventional computer hardware operations.

Although as used herein, the term "Internet infrastructure" encompasses a variety of hardware and software mechanisms, the term primarily refers to routers, router software, and physical links between these routers that function to transport data packets from one network node to another. As also used herein, a "digital sequence" may comprise, without limitation, computer program files, computer applications, data files, network packets, streaming data such as multimedia (including audio and video), telemetry data and any other form of data which can be represented by a digital or numeric sequence. The probabilistically unique identifiers produced by means of the hash file system and method of the present invention may also be used as URLs in network applications.

While there have been described above the principles of the present invention in conjunction with specific implementations and applications of the system and method of the present invention, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A computing environment comprising:
   at least one list for maintaining portions of digital sequences and corresponding probabilistically unique identifiers for each of said portions of said digital sequences;
   at least one new digital sequence;
   at least one partitioning mechanism for dividing said new digital sequence into a plurality of shorter digital sequences and producing a probabilistically unique identifier for each of said shorter digital sequences; and
   a comparison mechanism for determining if any one of said probabilistically unique identifiers for each of said plurality of shorter digital sequences is currently maintained in said list.

2. The computing environment of claim 1 wherein said at least one list comprises a plurality or lists.

3. The computing environment of claim 2 wherein said plurality of lists, each contain a portion of said probabilistically unique identifiers.

4. The computing environment of claim 2 wherein at least one of said plurality of lists is physically displaced from others of said at least one list.

5. The computing environment of claim 4 wherein said plurality of lists are coupled by means of a network.

6. The computing environment of claim 2 wherein said plurality of lists is partitioned based on said probabilistically unique identifiers.

7. The computing environment of claim 1 wherein said at least one list is physically displaced from said at least one partitioning mechanism.

8. The computing environment of claim 7 wherein said comparison mechanism is operative to utilize at least a portion of said probabilistically unique identifiers for each of said plurality of said shorter digital sequences as a locator correlated with said list partitions.

9. The computing environment of claim 1 wherein said list comprises a physically distributed database.

10. The computing environment of claim 1 wherein said at least one partitioning mechanism and said at least one list are coupled by means of a network.

11. The computing environment of claim 10 wherein said network comprises a public network such as the internet.

12. The computing environment of claim 11 wherein said at least one partitioning mechanism and said at least one list are physically distributed.

13. The computing environment of claim 1 wherein said probabilistically unique identifiers are produced by means of a hash function.

14. The computing environment of claim 13 wherein said hash function comprises an industry standard digest algorithm.

15. The computing environment of claim 14 wherein said has function comprises one of MD4, MD5 SHA or SHA-1 algorithms.

16. The computing environment of claim 13 wherein said probabilistically unique identifiers are produced by means of a checksum.

17. The computing environment of claim 1 wherein said digital sequences are of variable length.

18. The computing environment of claim 1 wherein said digital sequences are of invariable length.

19. The computing environment of claim 1 wherein said digital sequence comprises a data file.

20. The computing environment of claim 1 wherein said digital sequence comprises a data stream.

21. The computing environment of claim 1 wherein said digital sequence comprises an executable file.

22. The computing environment of claim 1 wherein said digital sequence comprises a database record.

23. The computing environment of claim 1 wherein said digital sequence comprises a database index.

24. The computing environment of claim 1 wherein said digital sequence comprises a digital device image.

25. The computing environment of claim 1 wherein said digital sequence comprises a network packet.

26. The computing environment of claim 1 wherein said digital sequence comprises a digitized analog signal.

27. The computing environment of claim 1 wherein any of said probabilistically unique identifiers and corresponding ones of said plurality of shorter digital sequences not determined to be maintained in said at least one list are added to said at least one list.

28. A method for establishing an identifier for at least a portion of a digital sequence comprising:
   performing a function on said at least a portion of said digital sequence to produce a probabilistically unique symbol therefore;
   establishing a correspondence between said at least a portion of said digital sequence and said probabilistically unique symbol; and
   utilizing said probabilistically unique symbol as said identifier.

29. The method of claim 28 wherein said identifier and said corresponding at least a portion of said digital sequence are maintained in at least one data list.

30. The method of claim 29 wherein at least a portion of said identifier is utilizable as a pointer to a location of said corresponding at least a portion of said digital sequence within said at least one data list.

31. The method of claim 28 herein said at least a portion of said digital sequence comprises at least a portion of a data file and said identifier is uniquely related to a content of said at least a portion of said data file.

32. The method of claim 28 wherein said at least a portion of said digital sequence comprises at least a portion of a data stream and said identifier is uniquely related to a content of said at least a portion of said data stream.

33. The method of claim 28 wherein said at least a portion of said digital sequence comprises at least a portion of an executable file and said identifier is uniquely related to a content of said at least a portion of said executable file.

34. The method of claim 28 wherein said step of performing a function is carried out by the step of:
   hashing said at least a portion of said digital sequence to produce said probabilistically unique symbol.

35. The method of claim 34 wherein said step of hashing is carried out by means of an industry standard digest algorithm.

36. The method of claim 35 wherein said step of hashing is carried out by means of one of an MD4, MD5, SHA or SHA-1 algorithm.

37. A computer program product comprising:
   a computer usable medium having computer readable code embodied therein for establishing an identifier for at least a portion of a digital sequence comprising:
   computer readable program code devices configured to cause a computer to effect performing a function on said at least a portion of said digital sequence to produce a probabilistically unique symbol therefore;
   computer readable program code devices configured to cause a computer to effect establishing a correspondence between said at least a portion of said digital sequence and said probabilistically unique symbol; and computer readable program code devices configured to cause a to effect utilizing said probabilistically unique symbol as said identifier.

38. The computer program product of claim 37 wherein said identifier and said corresponding at least a portion of said digital sequence are maintained in at least one data list.

39. The computer program product of claim 38 wherein at least a portion of said identifier is utilizable as a pointer to a location of said corresponding at least a portion of said digital sequence within said at least one data list.

40. The computer program product of claim 37 wherein said at least a portion of said digital sequence comprises at least a portion of a data file and said identifier is uniquely related to a content of said at least a portion of said data file.

41. The computer program product of claim 37 wherein said at least a portion of said digital sequence comprises at least a portion of a data stream and said identifier is uniquely related to a content of said at least a portion of said data stream.

42. The computer program product of claim 37 wherein said at least a portion of said digital sequence comprises at least a portion of an executable file and said identifier is uniquely related to a content of said at least a portion of said executable file.

43. The computer program product of claim 37 wherein said computer readable program code devices configured to cause a computer to effect performing a function is carried out by:

computer readable program code devices configured to cause a computer to effect hashing said at least a portion of said digital sequence to produce said probabilistically unique symbol.

44. The computer program product of claim 43 wherein said computer readable program code devices configured to cause a computer to effect hashing is carried out by means of an industry standard digest algorithm.

45. The computer program product of claim 44 wherein said computer readable program code devices configured to cause a computer to effect hashing is carried out by means of one of an MD4, MD5, SHA or SHA-1 algorithm.

* * * * *

UNITED STATES PATENT AND TRADEMARK OFFICE
CERTIFICATE OF CORRECTION

PATENT NO. : 6,704,730 B2
DATED : March 9, 2004
INVENTOR(S) : Gregory Hagan Moulton and Stephen B. Whitehill It is certified that error appears in the above-identified patent and that said Letters Patent is hereby corrected as shown below:

Column 15,
Line 56, insert -- , -- after MD5

Column 17,
Line 4, insert -- computer -- after a

Signed and Sealed this

Twenty-ninth Day of June, 2004

JON W. DUDAS
*Acting Director of the United States Patent and Trademark Office*